(12) United States Patent
Dudas et al.

(10) Patent No.: US 10,031,696 B2
(45) Date of Patent: *Jul. 24, 2018

(54) SUB-LUN INPUT/OUTPUT PROFILING FOR SSD DEVICES

(71) Applicant: INTERNATIONAL BUSINESS MACHINES CORPORATION, Armonk, NY (US)

(72) Inventors: Philip M. Dudas, Flagstaff, AZ (US); Paul A. Jennas, II, Tucson, AZ (US); Larry Juarez, Tucson, AZ (US); David Montgomery, San Jose, CA (US); Jason L. Peipelman, Travis, TX (US); Joshua M. Rhoades, Apex, NC (US); Todd Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,477

(22) Filed: Nov. 17, 2017

(65) Prior Publication Data

US 2018/0074750 A1    Mar. 15, 2018

Related U.S. Application Data

(63) Continuation of application No. 14/220,960, filed on Mar. 20, 2014, now Pat. No. 9,858,012, which is a
(Continued)

(51) Int. Cl.
*G06F 3/06* (2006.01)
*G06F 12/02* (2006.01)

(52) U.S. Cl.
CPC ............ *G06F 3/0655* (2013.01); *G06F 3/064* (2013.01); *G06F 3/0616* (2013.01); *G06F 3/0688* (2013.01); *G06F 12/0246* (2013.01)

(58) Field of Classification Search
CPC .. G06F 3/0655; G06F 12/0246; G06F 3/0616; G06F 3/0688; G06F 3/064
See application file for complete search history.

(56) References Cited

U.S. PATENT DOCUMENTS 6,895,464 B2    5/2005    Chow et al.
7,461,233 B2    12/2008    Hsieh et al.
(Continued)

OTHER PUBLICATIONS

IBM, "MRAM Bitmap for Flash Selective Bytewise Inversion," An IP.com Prior Art Database Technical Disclosure, IP.com No. IPCOM000170165D, May 10, 2008 (3 pages).
(Continued)

*Primary Examiner* — Michael Alsip
(74) *Attorney, Agent, or Firm* — Griffiths & Seaton PLLC

(57) ABSTRACT

A read/write ratio for each of a plurality of data segments classified in a hot category as hot data segments is determined. Each of the plurality of hot data segments is ordered by the read/write ratio in a descending order. Each of a plurality of available SSD devices is ordered by a remaining life expectancy in an ascending order. Those of the plurality of hot data segments are matched with those of the plurality of hot data segments with those of the plurality of available SSD devices such that a hot data segment having a higher read/write ratio is provided to an SSD device having a smaller remaining life expectancy than another hot data segment having a lower read/write ratio.

8 Claims, 2 Drawing Sheets

Related U.S. Application Data continuation of application No. 13/463,697, filed on May 3, 2012, now Pat. No. 8,713,244, which is a continuation of application No. 12/763,109, filed on Apr. 19, 2010, now Pat. No. 8,700,841.

(56) References Cited

U.S. PATENT DOCUMENTS

| | | |
|---|---|---|
| 2007/0083575 A1 | 4/2007 | Leung et al. |
| 2007/0233931 A1 | 10/2007 | Tanaka et al. |
| 2007/0260811 A1 | 11/2007 | Merry, Jr. et al. |
| 2008/0126673 A1 | 5/2008 | Kaneda |
| 2008/0222346 A1 | 9/2008 | Raciborski et al. |
| 2008/0288714 A1 | 11/2008 | Salomon et al. |
| 2009/0049234 A1 | 2/2009 | Oh et al. |
| 2009/0138654 A1 | 5/2009 | Sutardja |
| 2009/0164700 A1 | 6/2009 | Chen et al. |
| 2009/0172275 A1 | 7/2009 | Nochimowski et al. |
| 2009/0259795 A1 | 10/2009 | Panabaker et al. |

OTHER PUBLICATIONS

IBM, "Method and Apparatus for Combining Use of Magnetic Hard Drives and Solid State Disks for Optimal Performance and Lifespan," An IP.com Prior Art Database Technical Disclosure, IP.com No. IPCOM000179606D, Feb. 18, 2009 (3 pages).

SUB-LUN INPUT/OUTPUT PROFILING FOR SSD DEVICES

CROSS-REFERENCE TO RELATED APPLICATIONS

This Application is a Continuation of U.S. patent application Ser. No. 14/220,960, filed on Mar. 20, 2014, which is a Continuation of U.S. patent application Ser. No. 13/463,697, filed on May 3, 2012, which is a Continuation of U.S. patent application Ser. No. 12/763,109, filed on Apr. 19, 2010; the contents of each are incorporated herein by reference in their entirety.

FIELD OF THE INVENTION

The present invention relates in general to computers, and more particularly to apparatus, method and computer program product embodiments for performing input/output (I/O) profiling for SSD devices in a computing storage environment.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures, as described above, include a variety of storage mediums. These may include such media as enterprise hard disk drives (HDD), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

SSD storage devices represent an improvement over traditional hard disk devices in terms of reduced latency, as one of ordinary skill in the art will appreciate. SSD storage, however, currently has a drawback in that the storage may fail after many repeated writes. Thus, SSD storage is at least currently ideally suited to data that is read often, but written infrequently, allowing the SSD storage to provide fast access while retaining longevity of storage. A need exists, for example, for a mechanism whereby a determination of write frequency is used to determine such factors as placement of data segments in view of the characteristics of SSD storage previously described.

Accordingly, and in view of the foregoing, various embodiments for profiling input/output (I/O) for solid state drive (SSD) devices in a computing storage environment by a processor device are provided. In one embodiment, by way of example only, the processor device iterates through each data segment of a plurality of data segments in a candidate group to determine if the data segment has been accessed greater than a first predefined threshold, the candidate group including data segments that have been accessed less than the first predefined threshold and data segments that have been accessed greater than the first predefined threshold. If the data segment has been accessed less than the first predefined threshold, the data segment is maintained in a storage device in a lower level of the storage device hierarchy than the SSD devices, and if the data segment has been accessed greater than the first predefined threshold, the data segment is added to a hot list, the hot list being a subgroup of the candidate group including one or more other data segments previously selected from the candidate group that have been accessed greater than the first predefined threshold.

After each data segment of the plurality of data segments in the candidate group has been iterated, each data segment on the hot list is ordered based on frequency of access in descending order, and the ordered hot list of data segments is iterated through. A determination is made as to whether a read-to-write ratio for each data segment on the hot list is greater than a second predefined threshold, and if the read-to-write ratio for the data segment on the hot list is greater than the second predefined threshold, the data segment is added to a ratio list, the ratio list being a subgroup of the hot list. Each data segment is ordered on the ratio list by the read-to-write ratio in a descending order. Each of a plurality of available SSD devices is ordered by a remaining life expectancy in ascending order, and those data segments on the ratio list are matched with those of the plurality of available SSD devices such that a data segment on the ratio list having a higher read-to-write ratio is provided to an SSD device having a smaller remaining life expectancy than another data segment on the ratio list having a lower read-to-write ratio. Each data segment on the ratio list is stored with each respective matched available SSD device, and the remaining life expectancy for each of the plurality of available SSD devices is determined by calculating statistics of an aggregate read and write count obtained from a log for each of the plurality of available SSD devices.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for profiling input/output characteristics of data segments (such as extents) for computer storage environments in view of SSD storage characteristics to increase longevity, for example, and address performance-bottleneck potential issues associated with SSD writes by intelligently assigning data segments with more reads to a SSD pool of devices. While one illustrated embodiment depicts a tiered storage environment having SSD devices among a variety of storage devices configured in a tiered arrangement, one of ordinary skill in the art will appreciate that the mechanisms of the present invention are contemplated to be implementable in a variety of computing storage environments. The profiling mechanisms are performed at a sub-logical unit number (LUN) level, for example by examining the data segments themselves.

In one embodiment, input/output data is profiled to determine which data segments have a highest read-to-write ratio (read/write ratio). Concurrently and/or in addition, end of life predictions of SSD device pools are used using established methodologies. The derived set of data statistics collected during this profiling is then used to extrapolate data segment candidates appropriate for the SSD devices in the SSD pool(s), whereby the data segments are then mapped to the optimal SSD devices (such as SSD drives). In one embodiment, for example, those data segments having a highest read/write ratio are matched to those of the list of SSD devices having a larger remaining life expectancy than those data segments having a lower read/write ratio.

Figure 1:
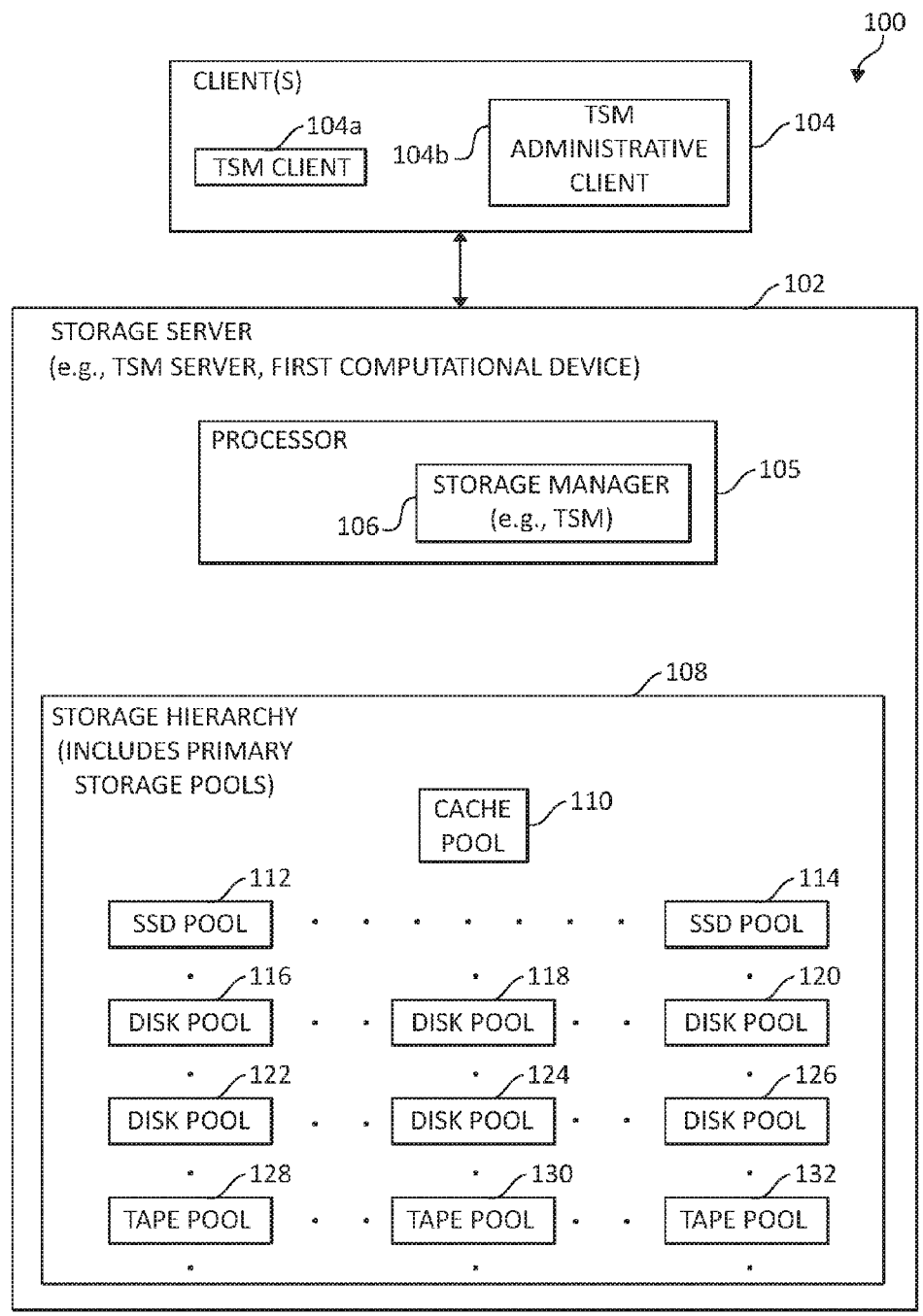
FIG. 1 illustrates a block diagram of an exemplary computing storage environment in accordance with certain embodiments.

Turning now to FIG. 1, a block diagram of a computing storage environment 100 in accordance with certain embodiments is illustrated. The computing storage environment 100 includes a first computational device, such as, a storage server 102, coupled to one or more computational devices, such as, clients 104. In certain embodiments, the storage server 102 and the clients 104 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as, the Tivoli® Storage Manager® (TSM) product marketed by International Business Machines (IBM®) Corporation, may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a. The storage manager 106 and/or processor device 105 may allow a system administrator to configure storage pools, where a storage pool comprises a group of devices used for storing data received from the TSM client 104a. Storage pools are used as targets for store operations from the TSM client 104a and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric including write or read speeds. The storage hierarchy 108 as shown may be organized such that the top of the hierarchy may include a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114).

Below the SSD pools 112 and 114, a first tier of disk pools (e.g., disk pools 116, 118, and 120) may be then organized. As one of ordinary skill in the art will appreciate, disk pools 116, 118, and 120 may include a variety of disk devices such as pools of enterprise disk drives, SATA disk drives, disk devices configured in a particular redundant array of independent disks (RAID) configuration, and the like.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism.

As previously mentioned, the illustrated embodiments provide mechanisms for placement of appropriate data in the SSD pools 112 and 114, and thereby overall placement of data between storage mediums such as that found in the storage hierarchy 108. In one embodiment including a tier of disk pools corresponding to a number of SSD devices, the mechanisms of the present invention perform I/O profiling activity on particular data segments by examining such statistical information such as the aforementioned read/write ratio. Those data segments having a higher read-to-write ratio (e.g., less writes) are better candidates for SSD storage than those data segments having a lower read-to-write ratio ore writes). In addition, the illustrated embodiments examine the SSD devices in a particular pool to build an inventory of the SSD devices as organized by a remaining useful life.

As will be further described, as a preliminary matter, each data segment in a candidate group (such as those in a particular volume or group of volumes, pool, tier of pools, or similar group) may be first analyzed to determine if the particular data segment has been repetitively accessed. If this is the case, the particular data segment is thought to be a good candidate for SSD storage, as its particular I/O profile demonstrates that the data segment is in demand, and that overall performance of the computing environment would benefit if the latency of this particular data segment were reduced.

If a particular data segment is identified as described above, it may then be added to a "hot" list of data segments. The hot list of data segments is then iterated, and for a given extent, the read/write ratio is examined. If the read/write ratio is determined to be greater than a predefined threshold, the hot data segment is added to an additional list of "ratio" data segments that are identified as having a higher read/write ratio.

An inventory of SSD devices in a particular group (such as a tier of SSD volumes) may then be generated, and ordered by a remaining useful life in a "drive list." Calculation of remaining useful life of a particular SSD device may proceed pursuant to various techniques as will be further described. Once the inventory of SSD devices is ascertained, the listing of "ratio" data segments are mapped to the listing of SSD devices, such that those data segments having the highest read/write ratio are assigned to SSD devices having the lowest remaining useful life. In this way, those SSD devices having a lower remaining useful life are assigned extents with a higher read/write ratio versus other SSD devices having a higher remaining useful life. This is performed in an effort to extend the lifetimes of the SSD devices with the lower remaining useful life (by, for example, not loading these SSD devices with data segments having a propensity to lower the devices' life expectancies), and to ensure that multiple devices do not fail about the same period of time.

Figure 2:
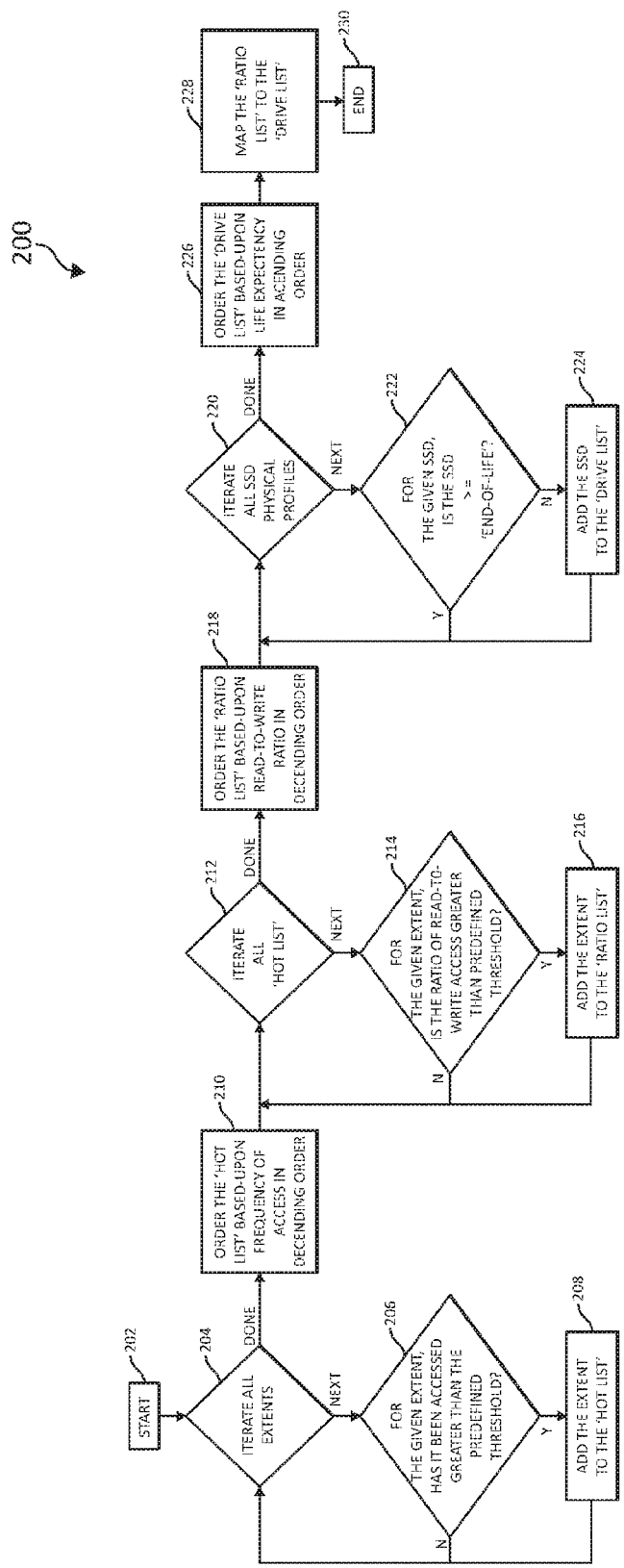
FIG. 2 illustrates a flow chart diagram of an exemplary method for profiling input/output for SSD devices according to one embodiment of the present invention.

Turning to FIG. 2, following, an exemplary method 200 for performing I/O profiling for data segments (here represented as extents) for assignment to SSD devices is illustrated in flow chart diagram format. As one of ordinary skill in the art will appreciate, various steps in the method 200 may be implemented in differing ways to suit a particular application. In addition, the described method 200 may be implemented by various means, such as hardware, software, firmware, or a combination thereof operational on or otherwise associated with the computing storage environment. For example, the methods 200 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 begins (step 202) by iteration through all the extents in the candidate group (step 204). Again, the group may include a volume, a number of volumes in a tier or pool, etc. For a given extent, if it is determined that the extent has been accessed greater than a predefined threshold (step 206), the extent is added to the listing of hot extents (step 208). The steps 204, 206, and 208 are repeated for each extent in the candidate group. The "hot list" of hot extents is then ordered based on the frequency of access in descending order (step 210).

Moving to step 212, each of the extents classified as hot extents is iterated. For a given extent, if the ratio of read-to-write (read/write ratio) access is greater than a predefined threshold (step 214), the hot extent is added to the ratio listing (step 216). The steps 212, 214, and 216 are repeated for each extent in the hot list. The ratio listing is then ordered based on the read/write ratio in descending order (step 218). In other words, those of the ratio listed extents having the highest read/write ratio are prioritized at the top of the ratio list.

Moving now to step 220, the physical properties of all SSD devices in a particular grouping (again such as a pool or tier) is iterated. For a given SSD device, if the SSD is determined to be greater than or equal to a predefined end of life (step 222), the SSD device is then added to a drive list (step 224). The steps 220, 222, and 224 are repeated for each SSD in the grouping. The drive list is ordered based on life expectancy in an ascending order (step 226). In other words, those SSD drives having the lowest life expectancy (lowest remaining useful life) are prioritized at the top of the drive list.

Determinations of remaining useful life may be calculated using a variety of techniques. For example, statistics such as a number of aggregate write or read counts may be obtained from a log or another source. An installation date and/or an expiration date may be consulted. In addition, a time of use counter (e.g., the number of hours the devices have been in operation) may be examined. The statistics may be used to determine a current lifespan for a particular device. To determine a remaining useful life expectancy, in one embodiment, a comparison may be made for each of the SSD devices between the current lifespan and a predetermined service life (e.g., the predetermined service life minus the current lifespan). Additional techniques known to one of ordinary skill in the art may be implemented.

In a final step, the items in the ratio list are mapped to the items in the drive list, such that those data segments having the highest read/write ratio are assigned to the SSD devices having the lowest remaining useful life (step 228). The method 200 then ends (step 230).

As one of ordinary skill in the art will appreciate, the method 200 may be additionally performed on a scheduled interval in lieu of the storage request previously described. The scheduling may occur pursuant to various implementations of the computing storage environment. For example, the scheduling may coincide with periods of high and/or low storage activity. The scheduling may be configured by a system administrator using the storage manager 106 (FIG. 1) or by other similar means.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for profiling input/output (I/O) for solid state drive (SSD) devices in a computing storage environment including a storage device hierarchy, comprising:
    a processor device executing instructions stored in a memory, wherein the processor device, when executing the instructions, performs each of:
        iterating through each data segment of a plurality of data segments in a candidate group to determine if the data segment has been accessed greater than a first predefined threshold, the candidate group including data segments that have been accessed less than the first predefined threshold and data segments that have been accessed greater than the first predefined threshold,
        if the data segment has been accessed less than the first predefined threshold, maintaining the data segment in a storage device in a lower level of the storage device hierarchy than the SSD devices,
        if the data segment has been accessed greater than the first predefined threshold, adding the data segment to a hot list, the hot list being a subgroup of the candidate group including one or more other data segments previously selected from the candidate group that have been accessed greater than the first predefined threshold,
        after each data segment of the plurality of data segments in the candidate group has been iterated, ordering each data segment on the hot list based on frequency of access in descending order,
        iterating through the ordered hot list of data segments,
        determining whether a read-to-write ratio for each data segment on the hot list is greater than a second predefined threshold,
        if the read-to-write ratio for the data segment on the hot list is greater than the second predefined threshold, adding the data segment to a ratio list, the ratio list being a subgroup of the hot list,
        ordering each data segment on the ratio list by the read-to-write ratio in a descending order,
        ordering each of a plurality of available SSD devices by a remaining life expectancy in ascending order,
        matching those data segments on the ratio list with those of the plurality of available SSD devices such that a data segment on the ratio list having a higher read-to-write ratio is provided to an SSD device having a smaller remaining life expectancy than another data segment on the ratio list having a lower read-to-write ratio,
        storing each data segment on the ratio list with each respective matched available SSD device, and
        determining the remaining life expectancy for each of the plurality of available SSD devices by calculating statistics of an aggregate read and write count obtained from a log for each of the plurality of available SSD devices.

2. The system of claim 1, wherein determining the remaining life expectancy for each of the plurality of available SSD devices includes examining a plurality of physical profiles stored for each of the plurality of available SSD devices.

3. The system of claim 2, wherein determining the remaining life expectancy for each of the plurality of available SSD devices includes calculating a current lifespan by considering at least one of an installation date and a time of use counter.

4. The system of claim 3, wherein determining the remaining life expectancy for each of the plurality of available SSD devices further includes comparing, for each of the plurality of available SSD devices, the current lifespan against a predetermined service life.

5. A computer program product for profiling input/output (I/O) for solid state drive (SSD) devices in a computing storage environment including a storage device hierarchy by a processor device, the computer program product embodied on a non-transitory computer-readable storage medium having computer-readable program code portions stored therein, the computer-readable program code portions comprising:

an executable portion that iterates through each data segment of a plurality of data segments in a candidate group to determine if the data segment has been accessed greater than a first predefined threshold, the candidate group including data segments that have been accessed less than the first predefined threshold and data segments that have been accessed greater than the first predefined threshold, an executable portion that, if the data segment has been accessed less than the first predefined threshold, maintains the data segment in a storage device in a lower level of the storage device hierarchy than the SSD devices, an executable portion that, if the data segment has been accessed greater than the first predefined threshold, adds the data segment to a hot list, the hot list being a subgroup of the candidate group including one or more other data segments previously selected from the candidate group that have been accessed greater than the first predefined threshold, an executable portion that, after each data segment of the plurality of data segments in the candidate group has been iterated, orders each data segment on the hot list based on frequency of access in descending order, an executable portion that iterates through the ordered hot list of data segments, an executable portion that determines whether a read-to-write ratio for each data segment on the hot list is greater than a second predefined threshold, an executable portion that, if the read-to-write ratio for the data segment on the hot list is greater than the second predefined threshold, adds the data segment to a ratio list, the ratio list being a subgroup of the hot list, an executable portion that orders each data segment on the ratio list by the read-to-write ratio in a descending order, an executable portion that orders each of a plurality of available SSD devices by a remaining life expectancy in ascending order, an executable portion that matches those data segments on the ratio list with those of the plurality of available SSD devices such that a data segment on the ratio list having a higher read-to-write ratio is provided to an SSD device having a smaller remaining life expectancy than another data segment on the ratio list having a lower read-to-write ratio, an executable portion that stores each data segment on the ratio list with each respective matched available SSD device, and an executable portion that determines the remaining life expectancy for each of the plurality of available SSD devices by calculating statistics of an aggregate read and write count obtained from a log for each of the plurality of available SSD devices.

6. The computer program product of claim 5, wherein determining the remaining life expectancy for each of the plurality of available SSD devices includes examining a plurality of physical profiles stored for each of the plurality of available SSD devices.

7. The computer program product of claim 6, wherein determining the remaining life expectancy for each of the plurality of available SSD devices includes calculating a current lifespan by considering at least one of an installation date and a time of use counter.

8. The computer program product of claim 7, wherein determining the remaining life expectancy for each of the plurality of available SSD devices further includes comparing, for each of the plurality of available SSD devices, the current lifespan against a predetermined service life.

* * * * *